(12) United States Patent
Shi (10) Patent No.: US 11,943,780 B2
(45) Date of Patent: Mar. 26, 2024

(54) PHYSICAL DOWNLINK CONTROL CHANNEL DETECTION METHOD AND DEVICE AND STORAGE MEDIUM

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 479 days.

(21) Appl. No.: 17/201,887

(22) Filed: Mar. 15, 2021

(65) Prior Publication Data

US 2021/0227519 A1    Jul. 22, 2021

Related U.S. Application Data (63) Continuation of application No. PCT/CN2018/106791, filed on Sep. 20, 2018.

(51) Int. Cl.
*H04W 72/23* (2023.01)
(52) U.S. Cl.
CPC .................................. *H04W 72/23* (2023.01)
(58) Field of Classification Search
CPC ....... H04W 72/23; H04W 72/20; H04L 5/0053
See application file for complete search history.

(56) References Cited

U.S. PATENT DOCUMENTS

| | | | |
|---|---|---|---|
| 2012/0275391 A1 | 11/2012 | Cui et al. | |
| 2015/0124729 A1 | 5/2015 | Lee et al. | |
| 2015/0305065 A1* | 10/2015 | Bai | H04W 74/0833 |
| | | | 370/329 |
| 2017/0202032 A1 | 7/2017 | Tan et al. | |
| 2018/0132243 A1 | 5/2018 | Yang et al. | |
| 2020/0196343 A1* | 6/2020 | Marinier | H04L 1/1896 |

FOREIGN PATENT DOCUMENTS

| | | |
|---|---|---|
| CN | 102045849 | 5/2011 |
| CN | 102823313 | 12/2012 |
| CN | 102948104 | 2/2013 |
| CN | 103339981 | 10/2013 |
| CN | 104919883 A | 9/2015 |
| CN | 108271259 A | 7/2018 |
| CN | 108282290 | 7/2018 |
| CN | 114916081 A | 8/2022 |
| WO | 2009118703 | 10/2009 |

OTHER PUBLICATIONS

CNIPA, Second Office Action for CN Application No. 201880097269.2, dated Mar. 31, 2023.

(Continued)

*Primary Examiner* — Steven Hieu D Nguyen
(74) *Attorney, Agent, or Firm* — Hodgson Russ LLP (57) ABSTRACT

A physical downlink control channel detection method includes: sending, by a terminal device, control information to a network device; and determining, by the terminal device, a Search Space (SS) based on the control information, where the SS is used for the terminal device to detect a Physical Downlink Control Channel (PDCCH).

7 Claims, 3 Drawing Sheets

A terminal device sends control information to a network device — S201

The terminal device determines an SS based on the control information — S202

(56) References Cited

OTHER PUBLICATIONS

CNIPA, Notification of Granting Invention Patent Right for CN Application No. 201880097269.2, dated Jun. 21, 2023.
Guangdong Oppo Mobile Telecom, "Views on DL control channel for NR," 3GPP TSG RAN WG1 NR Ad-Hoc Meeting, R1-1700562, Jan. 2017.
Guangdong Oppo Mobile Telecom, "On NR PDCCH Search space configuration," 3GPP TSG RAN WG1 NR Ad-Hoc Meeting, R1-1700565, Jan. 2017.
CNIPA, First Office Action for CN Application No. 201880097269.2, dated Aug. 9, 2022.
WIPO, International Search Report and Written Opinion for PCT/CN2018/106791, dated Jun. 19, 2019.
3GPP, "Technical Specification Group Radio Access Network; NR; Physical layer procedures for control", 3GPP TS 38.213, Sep. 2018, V15.3.0, Release 15.
CNIPA, First Office Action for CN Application No. 202210858019.4, dated Jun. 26, 2023.
CNIPA, Second Office Action for CN Application No. 202210858019.4, dated Oct. 10, 2023.

\* cited by examiner

PHYSICAL DOWNLINK CONTROL CHANNEL DETECTION METHOD AND DEVICE AND STORAGE MEDIUM

CROSS-REFERENCE

This application is a continuation of International Application No. PCT/CN2018/106791, filed on Sep. 20, 2018, the entire disclosure of which is incorporated herein by reference.

TECHNICAL FIELD

The present disclosure relates to the technical field of wireless communications, and in particular to a Physical Downlink Control Channel (PDCCH) detection method and device and a storage medium.

BACKGROUND

In a 5th Generation (5G) New Radio (NR) system, a terminal device needs to detect the PDCCH according to Search Space (SS) configuration information, thereby obtaining Downlink Control Information (DCI). In some scenarios, it is necessary to detect the PDCCH based on different SS configurations.

SUMMARY

In a first aspect, embodiments of the present disclosure provide a physical downlink control channel detection method, including:
  sending, by a terminal device, control information to a network device; and
  determining, by the terminal device, a Search Space (SS) based on the control information, where the SS is used for the terminal device to detect a PDCCH.

In a second aspect, embodiments of the present disclosure provide a physical downlink control channel detection method, including:
  receiving control information by a network device; and
  determining, by the network device, an SS based on the control information, where the SS is used for the network device to send a PDCCH.

In a third aspect, embodiments of the present disclosure provide a terminal device, including:
  a sending unit configured to send control information to a network device; and
  a first processing unit configured to determine an SS based on the control information, where the SS is used for the terminal device to detect a PDCCH.

In a fourth aspect, embodiments of the present disclosure provide a network device, including:
  a receiving unit configured to receive control information; and
  a second processing unit configured to determine an SS based on the control information, where the SS is used for the network device to send a PDCCH.

In a fifth aspect, embodiments of the present disclosure provide a terminal device, including: a processor and a memory configured to store a computer program that can run on the processor, wherein the processor is configured to execute the computer program to perform the steps of the physical downlink control channel detection method performed by the foregoing terminal device.

In a sixth aspect, embodiments of the present disclosure provide a network device, including: a processor and a memory configured to store a computer program that can run on the processor, wherein the processor is configured to execute the computer program to perform the steps of the physical downlink control channel detection method performed by the foregoing network device.

In a seventh aspect, embodiments of the present disclosure provide a storage medium that stores an executable program which, when being executed by a processor, implements the physical downlink control channel detection method performed by the foregoing terminal device.

In an eighth aspect, embodiments of the present disclosure provide a storage medium that stores an executable program which, when being executed by a processor, implements the physical downlink control channel detection method performed by the foregoing network device.

DETAILED DESCRIPTION

In order to understand the features and technical content of the embodiments of the present disclosure in more detail, implementations of embodiments of the present disclosure will be described in detail below with reference to the accompanying drawings. The drawings are for reference and explanation purposes only and are not intended to limit the embodiments of the present disclosure.

Before describing the embodiments of the present disclosure in detail, a brief description of a PDCCH is given first.

In the NR system, the terminal device needs to detect the PDCCH to obtain Downlink Control Information (DCI). Before the terminal device detects the PDCCH, it needs to receive an SS configuration and detect the PDCCH based on the SS configuration. If the detection of the PDCCH is to be changed, the network device needs to reconfigure the SS of the terminal device through Radio Resource Control (RRC) signaling.

Moreover, since the PDCCH serves the data service of the terminal device, and the data service has a bursty property, when a large amount of data arrives, the terminal device is expected to detect the PDCCH more frequently to realize timely scheduling of the data service, and when the data service is inactive, the terminal device is expected to reduce PDCCH detection opportunity so as to save power. Changing the PDCCH detection opportunity requires the network device to reconfigure the terminal device through the RRC signaling, and thus such method for detecting the PDCCH is not flexible enough.

In order to detect the PDCCH flexibly, in the embodiments of the present disclosure, the DCI or Media Access Control (MAC) Customer Edge (CE) is used for dynamical activation or deactivation, or the SS of the terminal device is switched, for example, between the SSs of different periods so as to save power. However, all of these methods control the terminal device to switch the SS through downlink signaling, which increases the signaling overhead.

In view of the above problems, the present disclosure provides a physical downlink control channel detection method, which can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G system, etc.

Figure 1:
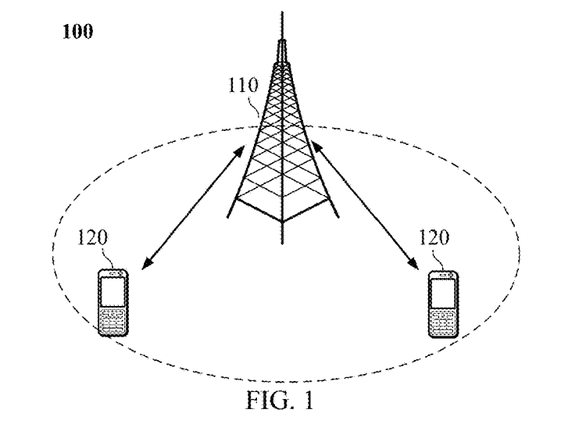
FIG. 1 is a schematic diagram of a composition structure of a communication system according to an embodiment of the present disclosure.

For example, a communication system to which the embodiments of the present disclosure are applied is as shown in FIG. 1. The communication system 100 may include a network device 110 which may be a device that communicates with a terminal device 120 (or referred to as a communication terminal or a terminal). The network device 110 can provide communication coverage for a specific geographic area, and can communicate with terminal devices located in the coverage area. Optionally, the network device 110 can be a Base Transceiver Station (BTS) in a GSM system or a CDMA system, a NodeB (NB) in a WCDMA system, an Evolutional Node B (eNB or eNodeB) in a LTE system, or a wireless controller in a Cloud Radio Access Network (CRAN). Optionally, the network device can be a mobile switching center, a relay station, an access point, an on-board device, a wearable device, a hub, a switch, a bridge, a router, a network side device in a 5G network, a network device in future evolutional Public Land Mobile Network (PLMN), or the like.

The communication system 100 also includes at least one terminal device 120 located within the coverage range of the network device 110. As used herein, the terminal device includes, but is not limited to, a device configured to receive/send communication signals and/or an Internet of Things (IoT) device, which may be connected with another device via wired lines, such as a Public Switched Telephone Network (PSTN), a Digital Subscriber Line (DSL), digital cables, and direct cable connections; via another data connection/network; and/or via a wireless interface, such as cellular networks, wireless local area networks (WLAN), digital TV networks such as DVB-H networks, satellite networks, and a AM-FM broadcast transmitter. A terminal device configured to communicate through a wireless interface may be referred to as a "wireless communication terminal", a "wireless terminal" or a "mobile terminal". Examples of the mobile terminal include but are not limited to satellite or cellular phones; Personal Communications System (PCS) terminals that can combine cellular radio phones with data processing, fax, and data communication capabilities; PDAs that may include radio phones, pagers, Internet/intranet access, Web browsers, memo pads, calendars, and/or Global Positioning System (GPS) receivers; and conventional laptop and/or palmtop receivers or other electronic devices including radio telephone transceivers. The terminal device may refer to access terminals, User Equipment (UE), user units, user stations, mobile stations, mobile sites, remote stations, remote terminals, mobile equipment, user terminals, terminals, wireless communication equipment, user agents, or user devices. The access terminal may be a cellular phone, a cordless phone, a Session Initiation Protocol (SIP) phone, a wireless local loop (WLL) station, a Personal Digital Assistant (PDA), and wireless communication functional handheld devices, computing devices or other processing devices connected to wireless modems, in-vehicle devices, wearable devices, terminal devices in 5G networks, terminal devices in the future evolution of PLMN, or the like.

Optionally, Device to Device (D2D) communication may be performed between the terminal devices 120.

Optionally, the 5G system or 5G network may also be referred to as a New Radio (NR) system or NR network.

FIG. 1 exemplarily shows one network device and two terminal devices. Optionally, the communication system 100 may include multiple network devices, and other numbers of terminal devices can be included in the coverage of each network device, which are not particularly limited in the embodiments of the present disclosure.

Optionally, the communication system 100 may also include other network entities such as a network controller and a mobility management entity, which are not limited in the embodiments of the present application.

It should be understood that the device with a communication function in the network and/or system of the embodiments of the present disclosure may be referred to as the communication device. Taking the communication system 100 shown in FIG. 1 as an example, the communication device may include a network device 110 and terminal devices 120 which have the communication function. The network device 110 and the terminal devices 120 may be the specific devices as described above, which will not be repeated here. The communication device may also include other devices in the communication system 100, such as a network controller, a mobility management entity, and other network entities, which are not limited in the embodiments of the present disclosure.

Figure 2:
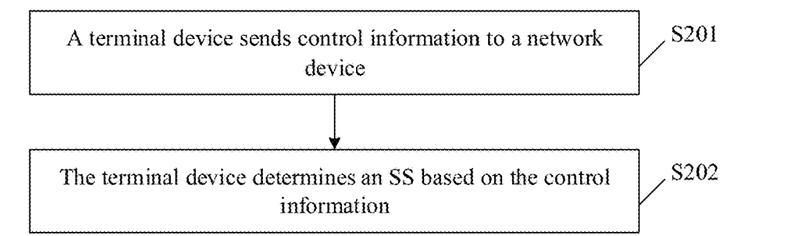
FIG. 2 is a schematic diagram of an optional processing flow of a physical downlink control channel detection method applied to a terminal device according to an embodiment of the present disclosure.

As shown in FIG. 2, an optional processing flow of a physical downlink control channel detection method applied to a terminal device provided by the embodiments of the present disclosure includes the following steps.

In step 201, a terminal device sends control information to a network device.

In some embodiments, the control information explicitly indicates an SS used for the terminal device to detect a PDCCH.

In some other embodiments, the control information is an SR.

In still other embodiments, the control information is a BSR.

In still other embodiments, the control information is the SR and the BSR.

In step S202, the terminal device determines an SS based on the control information.

In some embodiments, when the control information explicitly indicates the SS used for the terminal device to detect the PDCCH, the terminal device determines the SS indicated in the control information as the SS used for the terminal device to detect the PDCCH.

In some other embodiments, the control information is an SR, the SR is signaling for a terminal device to request scheduling resources from a network device, and the SR is carried by a PUCCH. Each SR configuration is associated with one or more logical channels, each logical channel is mapped to zero or one SR configuration, and the SR configuration is configured through the RRC signaling. The network device configures Logical Channel Configuration information elements for the terminal device through the RRC signaling. The Logical Channel Configuration includes a SR ID information element, which includes a SR Resource ID for indicating PUCCH resources for transmission of the SR.

In specific implementations, the SR is associated with at least one logical channel, and different logical channels have different delay requirements. A first mapping relationship between the logical channel and the SS is pre-configured, as shown in Table 1 below. The terminal device determines the SS based on the logic channel associated with the SR.

TABLE 1

| ID of logical channel associated with SR | Corresponding SS |
| --- | --- |
| 1 | SS 1 |
| 2 | SS 2 |
| 3 | SS 3 |

In configuring the mapping relationship between the logical channel and the SS, the delay requirement of the logical channel can be used as a reference factor. For example, a logical channel with a high delay requirement corresponds to an SS with a short period. Taking Table 1 as an example, the delay of the logical channel with ID 1 is less than the delay of the logical channel with ID 2, and the delay of the logical channel with ID 2 is less than the delay of the logical channel with ID 3. Accordingly, the period of SS1 is less than the period of SS2, and the period of SS2 is less than the period of SS3. Herein, in Table 1, the mapping relationship between logical channel ID and the SS is taken as an example, and in practical applications, it is also possible to configure the mapping relationship between a combination of the logical channels and the SS. For example, the logical channel combination of the logical channels with IDs 1 and 2 corresponds to SS1. It is also possible to use other forms that can characterize the mapping relationship between the logical channel ID and the SS.

Alternatively, in specific implementations, the terminal device determines the SS according to the number of SRs sent at one time. A second mapping relationship between the number of SRs sent at one time and the SS is established in advance, as shown in Table 2 below. The terminal device determines the SS based on the number of SRs sent at one time.

TABLE 2

| Number of SRs | Corresponding SS |
| --- | --- |
| 1 | SS 1 |
| 2 | SS 2 |
| 3 | SS 3 |

In Table 2, when the number of SRs sent by the terminal device at one time is 1, the terminal device switches the SS to SS1; when the number of SRs sent by the terminal device at one time is 2, the terminal device switches the SS to SS2; and when the number of SRs sent by the terminal device at one time is 3, the terminal device switches the SS to SS3.

Alternatively, in specific implementations, the terminal device determines the SS according to the number of times of sending the SR within a preset period of time. A third mapping relationship between the number of times of sending the SR within the preset period of time and the SS is established in advance, as shown in Table 3 below. The terminal device determines the SS based on the number of times of sending the SR within the preset period of time.

TABLE 3

| Level index of number of times of sending the SR | Corresponding SS |
| --- | --- |
| 1 | SS 1 |
| 2 | SS 2 |
| 3 | SS 3 |

In Table 3, based on the number of times of sending the SR within the preset period of time, the number of times of sending the SR is divided into different levels of numbers of times of sending the SR, a corresponding index is configured for a level of the number of times of sending the SR, and a correspondence between the level index of the number of times of sending the SR and the SS is established. When the level index of the number of times of sending the SR is 1, the terminal device switches the SS to SS1; when the level index of the number of times of sending the SR is 2, the terminal device switches the SS to SS2; and when the level index of the number of times of sending the SR is 3, the terminal device switches the target SS to SS3.

Alternatively, in specific implementations, the terminal device determines the SS based on at least two of the following: the at least one logical channel associated with the SR, the number of SRs sent at one time, and the number of times of sending the SR within the preset period of time. It can be understood that two or three factors among the at least one logical channel associated with the SR, the number of SRs sent at one time, and the number of times of sending the SR within the preset period of time can be used as a reference basis for determining the SS. For example, the SS can be determined only when the number of SRs sent at one time meets a first preset condition and the number of times of sending the SR within the preset period of time meets a second preset condition. As an example, the at least one logical channel associated with the SR and the number of SRs sent at one time can also be collectively used as the reference basis for determining the SS, or the at least one logical channel associated with the SR and the number of times of sending the SR within the preset period of time can be collectively used as the reference basis for determining the SS.

Alternatively, in specific implementations, the terminal device determines at least two candidate SSs based on the logical channel associated with the SR, and determines the SS from the at least two candidate SSs according to the number of SRs sent at one time.

Alternatively, in specific implementations, the terminal device determines the at least two candidate SSs based on the logical channel associated with the SR, and determines the SS from the at least two candidate SSs according to the number of times of sending the SR within the preset period of time.

It should be noted that, in the embodiments of the present disclosure, only the number of SRs sent by the terminal device at one time and the number of times of sending the SR within the preset period of time are taken as examples to illustrate that the terminal device determines the SS based on the SR. In practical applications, the terminal device can also determine the SS based on other information presented by the SR.

Figure 3A:
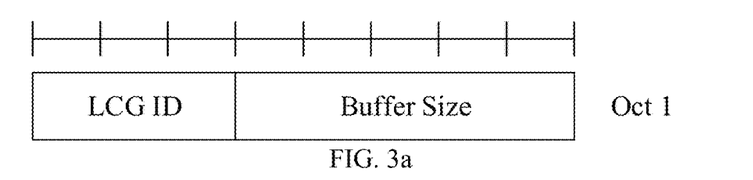
FIG. 3a is a schematic structural diagram of a short BSR according to an embodiment of the present disclosure.
Figure 3B:
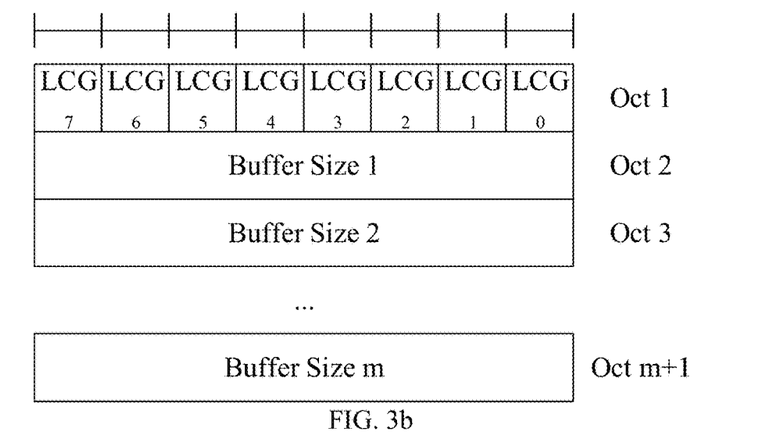
FIG. 3b is a schematic structural diagram of a long BSR according to an embodiment of the present disclosure.

In still other embodiments, when the control information is the BSR, the BSR is used for the terminal device to notify the network device of the amount of uplink data to be sent. FIG. 3a is a schematic structural diagram showing a short BSR, and FIG. 3b is a schematic structural diagram showing a long BSR. The terminal device needs to request the network device to schedule resources for sending the BSR through the SR before sending the BSR through the PUSCH. The content of the BSR includes a Logic Channel Group Identity (LCG ID) and a buffer size corresponding to the LCG ID.

In specific implementations, a fourth mapping relationship between the LCG ID and the SS is pre-configured, as shown in Table 4 below. The terminal device determines the SS according to the LCG ID in the BSR.

TABLE 4

| LCG ID associated with BSR | Corresponding SS |
|---|---|
| 1 | SS 1 |
| 2 | SS 2 |
| 3 | SS 3 |

In Table 4, when the LCG ID associated with the BSR is 1, the terminal device switches the SS to SS1; when the LCG ID associated with the BSR is 2, the terminal device switches the SS to SS2; and when the LCG ID associated with the BSR is 3, the terminal device switches the SS to SS3.

Alternatively, in specific implementations, a fifth mapping relationship between the buffer size included in the BSR and the SS is pre-configured, as shown in Table 5 below, and the terminal device determines the SS according to the buffer size in the BSR.

TABLE 5

| Buffer Size Level (index) | Corresponding SS |
|---|---|
| 1 | SS 1 |
| 2 | SS 2 |
| 3 | SS 3 |

In Table 5, based on the buffer size, the buffer size is divided into different buffer size levels, and a corresponding index is configured for each buffer size level so as to establish a correspondence between the buffer size level index and the SS. When the buffer size level index corresponding to the buffer size is 1, the terminal device switches the SS to SS1; when the buffer size level index corresponding to the buffer size is 2, the terminal device switches the SS to SS2; and when the buffer size level index corresponding to the buffer size is 3, the terminal device switches the SS to SS3. Herein, the greater the buffer size or the buffer size level index is, the shorter the period of the corresponding SS is.

Alternatively, in specific implementations, the terminal device determines the SS based on the logical channel group identity and the buffer size included in the BSR. For example, when the logical channel group identity included in the BSR corresponds to SS1 and the buffer size meets a third preset condition, it is determined to switch to SS1.

In the embodiments of the present disclosure, the buffer size level index can be configured based on Table 6.

TABLE 6

| Index | BS value |
|---|---|
| 0 | 0 |
| 1 | ≤10 |
| 2 | ≤14 |
| 3 | ≤20 |
| 4 | ≤28 |
| 5 | ≤38 |
| 6 | ≤53 |
| 7 | ≤74 |
| 8 | ≤102 |
| 9 | ≤142 |
| 10 | ≤198 |
| 11 | ≤276 |
| 12 | ≤384 |
| 13 | ≤535 |
| 14 | ≤745 |
| 15 | ≤1038 |
| 16 | ≤1446 |
| 17 | ≤2014 |
| 18 | ≤2806 |
| 19 | <3909 |
| 20 | ≤5446 |
| 21 | ≤7587 |
| 22 | ≤10570 |
| 23 | ≤14726 |
| 24 | ≤20516 |
| 25 | ≤28581 |
| 26 | ≤39818 |
| 27 | ≤55474 |
| 28 | ≤77284 |
| 29 | ≤107669 |
| 30 | ≤150000 |
| 31 | >150000 |

In still other embodiments, when the control information is the SR and BSR, the terminal device may first determine the candidate SSs according to the SR, and then determine the SS in the candidate SSs according to the BSR. For example, the SR is associated with two logical channels, and the two logical channels associated with the SR correspond to two SSs. In this case, the terminal device determines the SSs corresponding to the two logical channels as the candidate SSs. The terminal device then selects an SS from the two candidate SSs according to the BSR. If the buffer size in the BSR is relative large, the terminal device determines the SS corresponding to the logical channel with a higher delay requirement in the two candidate SSs as a final SS.

Of course, the terminal device can also determine the candidate SSs according to the number of SRs sent at one time, the number of times of sending the SR within the preset period of time length, or the like, and can select an SS among the candidate SSs according to the buffer size or LCG ID in the BSR.

In some other embodiments, the terminal device determines the SS based on at least one of: the at least one logical channel associated with the SR, the number of SRs sent at one time, and the number of times of sending the SR within the preset period of time, and based on the at least one of the logical channel group identity and the buffer size included in the BSR. For example, the SS can be determined only when the number of SRs sent at one time meets the first preset condition and the buffer size included in the BSR meets a fourth preset condition. As an example, the number of times of sending the SR within the preset period of time and the buffer size included in the BSR may also be used collectively as the reference basis for determining the SS. The number of times of sending the SR within the preset period of time and the logical channel group identity included in the BSR may also be used collectively as the reference basis for determining the SS. There are various parameter combinations that can be used for determining the SS based on the BSR and SR, which are not listed herein.

It should be noted that the first mapping relationship, the second mapping relationship, the third mapping relationship, the fourth mapping relationship, and the fifth mapping relationship in the embodiments of the present disclosure are all predefined or pre-configured by the network device, and are known to both the terminal device and the network device. The first mapping relationship, the second mapping relationship, the third mapping relationship, the fourth mapping relationship, and the fifth mapping relationship in the embodiments of the present disclosure may also be carried in the configuration information of the SS. For example, at least one of the buffer size level, the number of SRs sent by the terminal device at one time, the number of times of sending the SR within the preset period of time, LC ID, and LCG ID is added to the configuration information of the SS. Therefore, in the embodiments of the present disclosure, the control information is used not only for the terminal device to determine the SS, but also for the network device to determine the SS.

Optionally, the terminal device and the network device negotiate or determine in advance based on which one or two of the first mapping relationship, the second mapping relationship, the third mapping relationship, the fourth mapping relationship, and the fifth mapping relationship the SS is to be determined.

Optionally, after step S202 is performed, the method further includes:

step S203 of detecting, by the terminal device, a PDCCH based on the SS.

Figure 4:
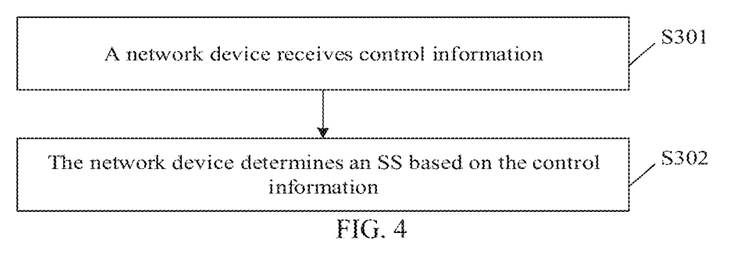
FIG. 4 is a schematic diagram of an optional processing flow of a physical downlink control channel detection method applied to a network device according to an embodiment of the present disclosure.

As shown in FIG. 4, an optional processing flow of a physical downlink control channel detection method applied to a network device provided by the embodiments of the present disclosure includes the following steps.

In step S301, the network device receives control information.

In the embodiments of the present disclosure, the explanation of the control information is the same as that in the foregoing step S201, which will not be repeated here.

In step S302, the network device determines an SS based on the control information.

In the embodiments of the present disclosure, the specific implementation for the network device to determine the SS based on the control information is the same as the specific implementation for the terminal device to determine the SS based on the control information in step S202, which will not be repeated here.

Optionally, after step S302 is performed, the method includes:

step S303 of sending, by the network device, a PDCCH based on the SS.

An optional process of a physical downlink control channel detection method applied to a communication system including a terminal device and a network device provided by the embodiments of the present disclosure includes the following steps.

In step a, the terminal device sends control information to the network device.

In step b, the terminal device and the network device determine an SS based on the control information.

Optionally, the terminal device and the network device can negotiate or determine in advance based on which one or two of the first mapping relationship, the second mapping relationship, the third mapping relationship, the fourth mapping relationship, and the fifth mapping relationship the SS is to be determined.

In step c, the network device sends a PDCCH based on the SS.

In step d, the terminal device detects the PDCCH based on the SS.

In the embodiments of the present disclosure, the terminal device determines the SS used for detection of the PDCCH based on the SR and/or BSR without the reconfiguration of the SS of the terminal device through the RRC signaling, thereby realizing the detection of different PDCCHs. In the embodiments of the present disclosure, when the SS is required to be switched so as to detect different PDCCHs, no RRC signaling interaction between the network device and the terminal device is required, which not only reduces the signaling overhead, but also realizes flexible configuration of the SS.

Figure 5:
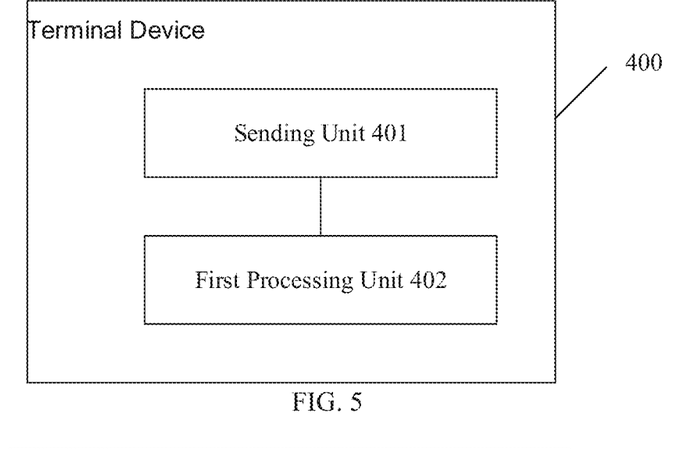
FIG. 5 is a schematic diagram of a composition structure of a terminal device according to an embodiment of the present disclosure.

The embodiments of the present disclosure also provide a terminal device. As shown in FIG. 5, a composition structure of the terminal device 400 includes:

a sending unit 401 configured to send control information to a network device; and a first processing unit 402 configured to determine an SS based on the control information, where the SS is used for the terminal device to detect a PDCCH.

In the embodiments of the present disclosure, when the control information is an SR, the SR is associated with at least one logical channel, and the first processing unit 402 is configured to determine the SS based on the logical channel by the terminal device.

Alternatively, the first processing unit 402 is configured to determine the SS based on the number of SRs sent at one time.

Alternatively, the first processing unit 402 is configured to determine the SS based on the number of times of sending the SR within a preset period of time.

In the embodiments of the present disclosure, when the control information is a BSR, the first processing unit 402 is configured to determine the SS based on a logical channel group identity included in the BSR.

Alternatively, the first processing unit 402 is configured to determine the SS based on a buffer size included in the BSR.

In the embodiments of the present disclosure, when the control information is the SR and the BSR, the first processing unit 402 is configured to determine the SS based on the SR and the BSR.

In the embodiments of the present disclosure, the first processing unit 402 is configured to determine, as the SS, an SS indicated in the control information.

In the embodiments of the present disclosure, the first processing unit 402 is configured to determine the SS based on at least two of: the at least one logical channel associated with the SR, the number of SRs sent at one time, and the number of times of sending the SR within the preset period of time.

In the embodiments of the present disclosure, the first processing unit 402 is configured to determine the SS based on the logical channel group identity and the buffer size included in the BSR.

In the embodiments of the present disclosure, the first processing unit 402 is configured to determine the SS based on at least one of: the at least one logical channel associated with the SR, the number of SRs sent at one time, and the number of times of sending the SR within the preset period of time, and based on at least one of the logical channel group identity and the buffer size included in the BSR.

In the embodiments of the present disclosure, the control information is further used for the network device to determine the SS.

In the embodiments of the present disclosure, the first processing unit 402 is further configured to perform PDCCH detection based on the determined SS.

Figure 6:
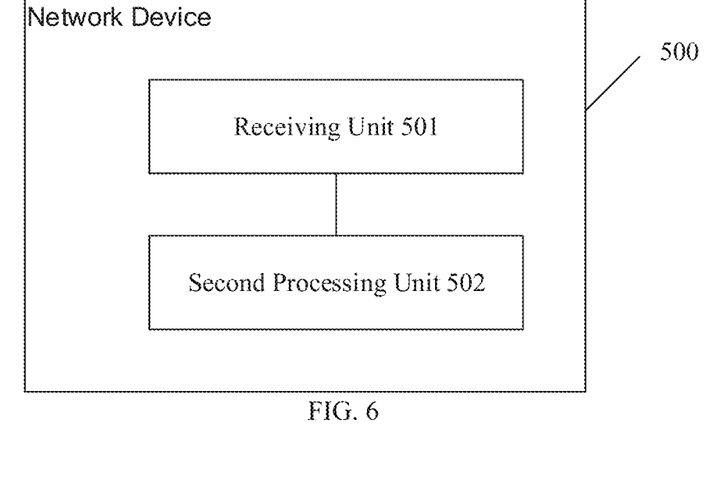
FIG. 6 is a schematic diagram of a composition structure of a network device according to an embodiment of the present disclosure.

The embodiments of the present disclosure also provide a network device. As shown in FIG. 6, a composition structure of a network device 500 includes:
 a receiving unit 501 configured to receive control information; and
 a second processing unit 502 configured to determine an SS based on the control information, where the SS is used for the network device to send a PDCCH.

In the embodiments of the present disclosure, when the control information is an SR, the SR is associated with at least one logical channel, and the second processing unit 502 is configured to determine the SS based on the logical channel.

Alternatively, the second processing unit 502 is configured to determine the SS based on the number of SRs sent at one time.

Alternatively, the second processing unit 502 is configured to determine the SS based on the number of times of sending the SR within a preset period of time.

In the embodiments of the present disclosure, when the control information is a BSR, the second processing unit 502 is configured to determine the SS based on a logical channel group identity included in the BSR.

Alternatively, the second processing unit 502 is configured to determine the SS based on a buffer size included in the BSR.

In the embodiments of the present disclosure, when the control information is the SR and BSR, the second processing unit 502 is configured to determine the SS based on the SR and the BSR.

In the embodiments of the present disclosure, the second processing unit 502 is configured to determine the SS based on at least two of: the at least one logical channel associated with the SR, the number of SRs sent at one time, and the number of times of sending the SR within the preset period of time.

In the embodiments of the present disclosure, the second processing unit 502 is configured to determine the SS based on the logical channel group identity and the buffer size included in the BSR.

In the embodiments of the present disclosure, the second processing unit 502 is configured to determine the SS based on at least one of: the at least one logical channel associated with the SR, the number of SRs sent at one time, and the number of times of sending the SR within the preset period of time, and based on at least one of the logical channel group identity and the buffer size included in the BSR.

In the embodiments of the present disclosure, the second processing unit 502 is configured to determine, as the SS, an SS indicated in the control information.

In the embodiments of the present disclosure, the control information is further used for the terminal device to determine the SS.

The embodiments of the present disclosure also provide a terminal device, including a processor and a memory for storing a computer program that can run on the processor, wherein the processor is configured to execute the computer program to perform the steps of the above method for determining the slot format performed by the terminal device.

The embodiments of the present disclosure also provide a network device, including a processor and a memory for storing a computer program that can run on the processor, wherein the processor is configured to execute the computer program to perform the steps of the above method for determining the slot format performed by the network device.

Figure 7:
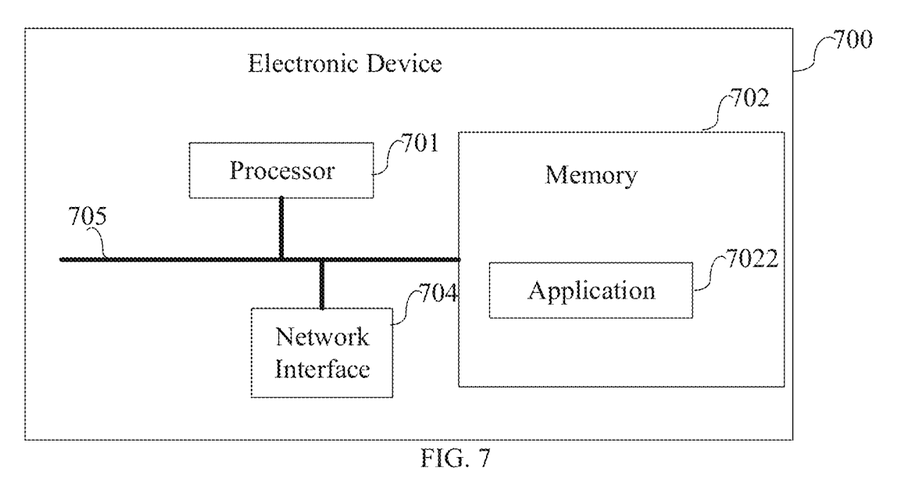
FIG. 7 is a schematic diagram of a hardware composition structure of an electronic device according to an embodiment of the present disclosure.

FIG. 7 is a schematic diagram of a hardware structure of an electronic device (a network device or a terminal device) according to an embodiment of the present disclosure. The electronic device 700 includes at least one processor 701, a memory 702, and at least one network interface 704. The various components in the electronic device 700 are coupled together through a bus system 705. It can be understood that the bus system 705 is used for connection and communication between these components. In addition to a data bus, the bus system 705 includes a power bus, a control bus, and a state signal bus. However, various buses are marked as the bus system 705 in FIG. 7 for the sake of clear description.

It can be understood that the memory 702 may be a volatile memory or a non-volatile memory, or may include both the volatile and non-volatile memories. The non-volatile memory can be a ROM, a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disk, or a Compact Disc Read-Only Memory (CD-ROM). The magnetic surface memory can be a disk storage or a tape storage. The volatile memory may be a Random Access Memory (RAM), which is used as an external cache. By way of exemplary but not restrictive description, various forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 702 described in the embodiments of the present disclosure is intended to include, but is not limited to, these and any other suitable types of memories.

The memory 702 in the embodiments of the present disclosure is used to store various types of data to support the operation of the electronic device 700. Examples of the data include any computer program operating on the electronic device 700, such as an application program 7022. The program for implementing the methods of the embodiments of the present disclosure may be included in the application program 7022.

The methods disclosed in the foregoing embodiments of the present disclosure may be applied in the processor 701 or implemented by the processor 701. The processor 701 may be an integrated circuit chip with signal processing capabilities. In the implementations, the steps of the foregoing methods can be carried out by hardware integrated logic circuits in the processor 701 or instructions in the form of software. The aforementioned processor 701 may be a general-purpose processor, a Digital Signal Processor (DSP), or other programmable logic devices, discrete gates, transistor logic devices, discrete hardware components, and the like. The processor 701 may implement or perform various methods, steps, and logical blocks disclosed in the embodiments of the present disclosure. The general-purpose processor may be a microprocessor or any conventional processor. The steps of the methods disclosed in the embodiments of the present disclosure can be directly embodied as being performed and completed by a hardware decoding processor, or performed by a combination of hardware and software modules in the decoding processor. The software modules may be located in a storage medium, and the storage medium is located in the memory 702. The processor 701 reads information in the memory 702 and carries out the steps of the foregoing methods in combination with its hardware.

In an exemplary embodiment, the electronic device 700 may be implemented by one or more application specific integrated circuits (ASICs), DSPs, programmable logic devices (PLDs), Complex Programmable Logic Devices (CPLDs), FPGAs, general-purpose processors, controllers, MCUs, MPUs, or other electronic components to perform the aforementioned methods.

The embodiments of the present disclosure also provide a computer-readable storage medium for storing a computer program.

Optionally, the computer-readable storage medium can be applied to the network device in the embodiments of the present application, and the computer program causes a computer to perform the corresponding processes which are implemented by the network device in the methods of the embodiments of the present application, which will not be repeated here for the sake of brevity.

Optionally, the computer-readable storage medium can be applied to the terminal device in the embodiments of the present application, and the computer program causes the computer to perform the corresponding processes which are implemented by the terminal device in the methods of the embodiments of the present application, which will not be repeated here for the sake of brevity.

The present disclosure is described with reference to the flowcharts and/or block diagrams of methods, devices (systems), and computer program products according to embodiments of the present disclosure. It should be understood that each process and/or block in the flowcharts and/or block diagrams, and combinations of processes and/or blocks in the flowcharts and/or block diagrams can be implemented by computer program instructions. These computer program instructions can be provided to the processor of a general-purpose computer, a special-purpose computer, an embedded processor, or processors of other programmable data processing devices to generate a machine, so that the instructions executed by the processor of the computer or other programmable data processing devices generate a device for implementing the functions specified in one or more processes in the flowcharts and/or one or more blocks in the block diagrams.

These computer program instructions can also be stored in a computer-readable memory that can guide a computer or other programmable data processing devices to operate in a specific manner, so that the instructions stored in the computer-readable memory produce an article of manufacture including an instruction device which implements the functions specified in one or more processes in the flowcharts and/or one or more blocks in the block diagrams.

These computer program instructions can also be loaded onto a computer or other programmable data processing devices to cause a series of operation steps to be performed on the computer or other programmable devices to generate computer-implemented processes, so that the instructions executed on the computer or other programmable devices provide steps for implementing the functions specified in one or more processes in the flowcharts and/or one or more blocks in the block diagrams.

Those described above are only preferred embodiments of the present disclosure and are not intended to limit the scope of protection of the present disclosure. Any modification, equivalent replacement and improvement made within the spirit and principle of the present disclosure shall be included within the protection scope of the present disclosure.

What is claimed is:

1. A physical downlink control channel detection method, comprising:
    sending, by a terminal device, control information to a network device; and
    determining, by the terminal device, a Search Space (SS) based on the control information, where the SS is used for the terminal device to detect a Physical Downlink Control Channel (PDCCH);
    wherein the control information is a Scheduling Request (SR); and
    wherein the determining, by the terminal device, the SS based on the control information comprises:
        determining, by the terminal device, the SS based on a number of SRs sent at one time.

2. The method according to claim 1, wherein the control information is further used for the network device to determine the SS.

3. The method according to claim 1, further comprising:
    performing, by the terminal device, PDCCH detection based on the determined SS.

4. A terminal device, comprising:
    a processor; and
    a memory for storing a computer program for running on the processor,
    wherein the processor is configured to execute the computer program to cause the terminal device to perform the physical downlink control channel detection method according to claim 1.

5. A physical downlink control channel detection method, comprising:
    receiving control information by a network device; and
    determining, by the network device, a Search Space (SS) based on the control information, wherein the SS is used for the network device to send a Physical Downlink Control Channel (PDCCH);
    wherein the control information is a Scheduling Request (SR); and
    wherein the determining, by the network device, the SS based on the control information comprises:
        determining, by the network device, the SS based on a number of SRs sent at one time.

6. The method according to claim 5, wherein the control information is further used for a terminal device to determine the SS.

7. A network device, comprising:
    a processor; and a memory for storing a computer program for running on the processor, wherein the processor is configured to execute the computer program to cause the network device to perform the physical downlink control channel detection method according to claim 5.

* * * * *